Oct. 1, 1935.  H. F. SMITH  2,015,822
GAS BURNER
Filed Feb. 28, 1931
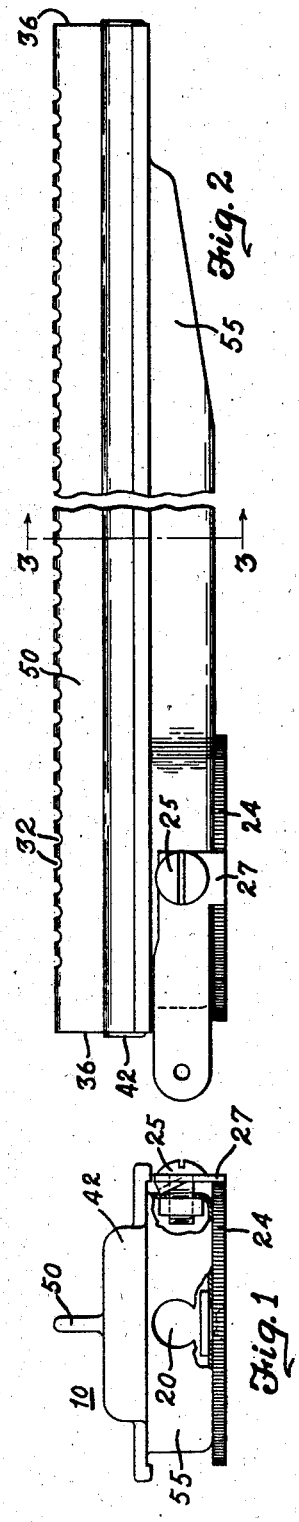
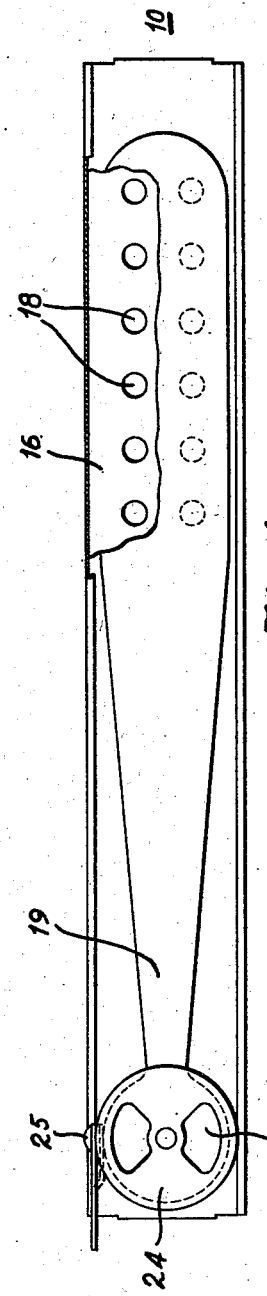
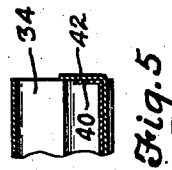
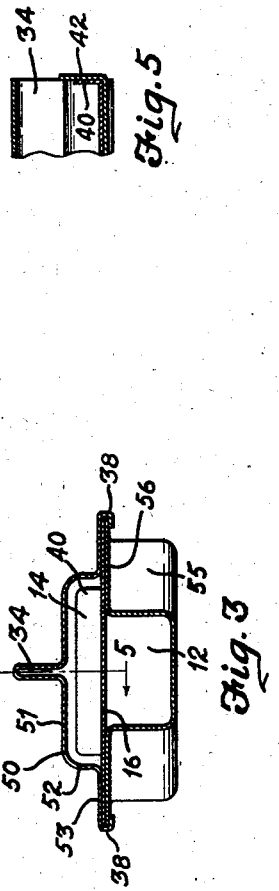
INVENTOR
Harry F. Smith
BY Spencer, Hardman & Fehr
ATTORNEY Patented Oct. 1, 1935

2,015,822

UNITED STATES PATENT OFFICE 2,015,822

GAS BURNER

Harry F. Smith, Dayton, Ohio, assignor, by mesne assignments, to General Motors Corporation, a corporation of Delaware Application February 28, 1931, Serial No. 519,118

14 Claims. (Cl. 158—116)

This invention relates to absorption refrigerating apparatus and more particularly to fuel burner assemblies for use with refrigerating apparatus of the absorption type.

One of the objects of my invention is to provide an improved fuel burner assembly and more particularly a unitary sheet metal burner assembly, simple in construction, easy and economical to manufacture and assemble, and efficient in operation.

A further object of my invention is to provide an improved method of manufacturing and assembling a fuel burner assembly, and particularly a method of manufacturing the burner proper.

Further objects and advantages of the present invention will be apparent from the following description, reference being had to the accompanying drawing, wherein a preferred form of the present invention is clearly shown.

In the drawing:

Fig. 1 is an end view partly in elevation and partly in section of my improved burner assembly;

Fig. 2 is a side view in elevation of the burner assembly;

Fig. 3 is a sectional view taken on the line 3—3 of Fig. 2;

Fig. 4 is a bottom view partly in plan and partly in section of the burner assembly; and Fig. 5 is a sectional view taken on the line 5—5 of Fig. 3.

Referring to the drawing, wherein throughout the several views like numerals have been used to designate like parts, I have disclosed a burner assembly generally designated by the reference character 10. The burner assembly is shown as including a mixing chamber 12, a fuel chamber 14, and a plate 16 provided with the openings 18 separating the mixing chamber 12 from the fuel chamber 14.

The mixing chamber is in the form of a tapered chamber as shown in Fig. 4. At the restricted end 19 of the chamber 12, there is provided a fuel opening 20 and a lateral air opening 22, the opening 22 being provided with a rotating slide valve 24 for regulating the size of the air opening 22. A set screw 25 carries a depending portion 27 adapted to engage the knurled edge of the slide valve 24 to maintain the said valve in any selected position.

It should be noted that the arrangement of the restricted portion 19 and the inlets 20 and 22 form in effect a venturi. Fuel entering the restricted portion 19 through the opening 20 draws in air through the lateral air passage 22, the air and fuel mixing intimately in the mixing chamber 12.

Located above the mixing chamber 12 is the fuel chamber 14. This chamber is separated from the mixing chamber 12 by the plate 16, the plate 16 being provided with a plurality of openings 18. The openings 18 provide communicating means between the chambers 12 and 14 and are located at a point remote from the restricted portion 19 of the chamber 12. By so locating the openings 18, there is provided a relatively long path of travel for the fuel and air to be mixed in the chamber 12, while at the same time any tendency to draw fuel downwardly through the openings 18 that would result if the openings were located nearer the restriction 19, is eliminated.

The fuel chamber 14 communicates with the fuel egress openings 32 through a restricted passage 34, the passage 34 being of a length sufficient to provide a complete dissipation of the heat normally present at the openings 32 before the heat has passed to the fuel chamber 14. In this manner the fuel chamber 14 is always maintained at a temperature below the igniting temperature of the fuel-air mixture contained therein.

The mixing chamber 12, plate 16, and fuel chamber 14 are formed of three sheet metal members 55, 16, and 50 respectively. The edges of the passages 34 are welded to provide a seal as at 36, while the longitudinally extending edge of the sheet metal member 50 forming the fuel chamber 14 is bent downwardly and inwardly over the plate 16 and over the longitudinally extending edge of the sheet metal member 55 forming the mixing chamber 12. These edges are welded to form a seal as shown at 38.

At the ends of the assembly, the plate 16 is provided with a lip bent upwardly to form a flange 40. The sheet metal member 55 forming the mixing chamber 12 is likewise provided with a lip bent upwardly to form a flange 42, the flange 42 being welded to the sheet metal member 50 forming the fuel chamber 14 to thereby seal the chambers 12 and 14.

In assembling the burner assembly, the sheet metal member 50 is first provided with a longitudinally extending row of punched out openings 32, the member 50 is then bent back upon itself to provide passage 34, and then outwardly, as at 51, downwardly, as at 52, and again outwardly to form the flange 53. The sheet metal member 55 forming the mixing chamber 12, is bent to form the tapered chamber 12 and the flange 56. The punched out plate 16 is placed on the flange 56 and the flange 53 of the member 50 is placed on the plate 16, the edge of the flange 53 being bent over and welded to the flange 56 to provide a seal as hereinbefore set forth. In the formation of the plate 16 and the chamber 12, the plate 16 and the sheet metal member 55 are provided with lips as hereinbefore set forth. These lips are bent upwardly to form the flanges 40 and 42 respectively, and the flanges 42 are welded to the sheet metal member 50 to thereby seal the chambers 12 and 14.

Thus it will be seen that I have provided a burner assembly wherein the fuel egress openings, the fuel chamber, and the mixing chamber are formed from three sheet metal members easily and rapidly manufactured and economical to assemble. In addition, the sheet metal member 50 is bent to provide the passage 36 communicating with the openings 32 and the fuel supply chamber to provide a passage wherein dissipation of the heat normally present at the openings 32 is assured. In addition, it should be noted that the distance between the two side sheets forming the fuel passage 34 to the burner openings 32 is small enough to prevent passage of flame from the openings 32 into the interior of chamber 14.

While the form of embodiment of the invention as herein disclosed, constitutes a preferred form, it is to be understood that other forms might be adopted, all coming within the scope of the claims which follow.

What is claimed is as follows:

1. A burner comprising a sheet metal member provided with a longitudinally extending row of aligned openings, said member being bent upon itself on a line extending parallel with and through said row of openings to form a passage leading to said openings, said passage being of a substantial length.

2. A burner comprising a sheet metal member provided with a longitudinally extending row of aligned openings, said member being bent upon itself on a line extending parallel with and through said row of openings to form a fuel chamber and a passage connecting said openings and said chamber, said passage being of a substantial length.

3. A burner assembly comprising a sheet metal member provided with a longitudinally extending row of aligned openings, said member being bent upon itself on a line parallel with and extending through said openings to form a fuel chamber and a passage connecting said chamber and said openings, a second sheet metal member below said fuel chamber and forming a tapered mixing chamber, a plate provided with a plurality of perforations between said sheet metal members, an air opening in said second named member, a fuel opening in said second named member, said members and said plate being secured together into a unitary structure.

4. A burner assembly comprising a sheet metal member provided with a longitudinally extending row of aligned openings, said member being bent upon itself on a line parallel with and extending through said row of openings to form a passage, a second sheet metal member bent upon itself to provide a mixing chamber communicating with said fuel chamber, said first and second named sheet metal members being secured together at their edges to provide a unitary structure.

5. A burner assembly comprising three sheet metal members secured together at their edges, one of said members being provided with a longitudinally extending row of aligned openings, said one of said members being bent upon itself on a line parallel with and extending through said row of openings to form a fuel chamber and a passage connecting said chamber and said openings, a second of said members being formed into a mixing chamber, and the third of said members being in the form of a perforated plate between said chambers.

6. A burner assembly comprising an upper sheet metal member provided with a longitudinally extending row of aligned openings, said member being bent upon itself on a line extending parallel with and through said row of openings to form a fuel chamber and a passage connecting said chamber and said openings, a lower sheet metal member forming a mixing chamber having an air inlet and a fuel inlet, one of said members having a flange secured and sealed to the other of said members.

7. A burner assembly comprising an upper sheet metal member forming a fuel chamber provided with egress openings, a lower sheet metal member formed into a mixing chamber provided with fuel and air openings, a plate-like sheet metal member located between said upper and lower sheet metal members and provided with openings, the lower of said members being provided with an extended end portion bent upwardly and securely sealed to said upper member, and said upper member being provided with a longitudinally extending flange overlapping a portion of said lower member.

8. A fuel burner including a metal sheet having apertures therein, said sheet being bent at the apertures to form a narrow fuel supplying section having a width not materially greater than the width of the apertures, providing a narrow passage leading to the apertures, and means for conducting fuel to the narrow passage.

9. A fuel burner including a metal sheet having a plurality of apertures therein, said sheet being bent downwardly on each side of a line extending through at least some of the apertures to form parallel side walls having a narrow passage therebetween having a width not greater than the width of the apertures, and means for conducting fuel to said narrow passage.

10. A fuel burner comprising a sheet metal member provided with a plurality of apertures therein, said sheet member being bent upon itself upon a line extending through at least some of the apertures to form a narrow passage leading to the apertures, and means for conducting fuel to the narrow passage.

11. A fuel burner comprising a sheet metal member provided with a plurality of apertures therein, said sheet member being bent upon itself upon a line extending through at least some of the apertures to form a narrow passage leading to the apertures, an enclosure forming a chamber connecting with and opening into the narrow passage, and means for conducting fuel to the chamber.

12. A fuel burner comprising a sheet metal member provided with a plurality of apertures therein, said sheet member being bent upon itself upon a line extending through at least some of the apertures to form a narrow passage leading to the apertures, and an enclosure forming a chamber connecting with and opening into the narrow passage.

13. A fuel burner comprising a sheet metal member provided with a plurality of apertures therein, said sheet member being bent upon itself upon a line extending through at least some of the apertures to form a narrow passage leading to the apertures, an enclosure forming a chamber connecting with and opening into the narrow passage, the width of the passage being less than the distance between the apertures and the enclosure.

14. A fuel burner including an enclosure forming a chamber and means for conducting a combustible mixture thereto, a single pair of thin flexible walls of metal extending in substantially parallel relation in the same general direction from the chamber and positioned close together so as to provide a single narrow passage of substantially uniform width therebetween, said narrow passage opening into the enclosure, said walls extending from the enclosure a substantial distance, said walls being exposed to the combustible mixture upon one side and the external air on the other side, and means directly connecting the walls of the narrow passage at a plurality of intermediate points.

HARRY F. SMITH.